(No Model.) 2 Sheets—Sheet 1.

J. KIMERER.
HAY AND GRAIN BIN.

No. 269,680. Patented Dec. 26, 1882.

WITNESSES
Wm A. Skinkle
Geo. W. Young

INVENTOR
Joseph Kimerer,
By his Attorneys
Baldwin, Hopkins & Peyton.

N. PETERS, Photo-Lithographer, Washington, D. C.

(No Model.) 2 Sheets—Sheet 2.

J. KIMERER.
HAY AND GRAIN BIN.

No. 269,680. Patented Dec. 26, 1882.

WITNESSES
Wm. A. Skinkle
Geo. W. Young

INVENTOR
Joseph Kimerer,
By his Attorneys
Baldwin, Hopkins & Peyton.

UNITED STATES PATENT OFFICE.

JOSEPH KIMERER, OF VALPARAISO, INDIANA.

HAY AND GRAIN BIN.

SPECIFICATION forming part of Letters Patent No. 269,680, dated December 26, 1882.

Application filed May 8, 1882. (No model.)

*To all whom it may concern:*

Be it known that I, JOSEPH KIMERER, of Valparaiso, in the county of Porter and State of Indiana, have invented certain new and useful Improvements in Hay and Grain Bins, of which the following is a specification.

My invention relates to bins in which hay and grain are stored when cut, so as to be protected from the wind and from rain or other falling weather.

The object of my invention is to provide an improved portable bin which permits of, first, free ventilation; second, of the ready raising and lowering of its roof to suit the bulk of the contents of the bin; third, of the ready attachment and detachment of the elevating devices, so as to permit their application to other bins to elevate or lower the roofs thereof; and, fourth, of suspending a turning or swiveling hay-fork from the center of the rising and falling roof, so as to enable a wagon to be unloaded from either of the four open sides of the bin.

A further object of my invention is to improve the construction of the vertically-adjustable roof so as to render it staunch and rigid without interfering with its adjustability or vertical movements.

Figure 1:
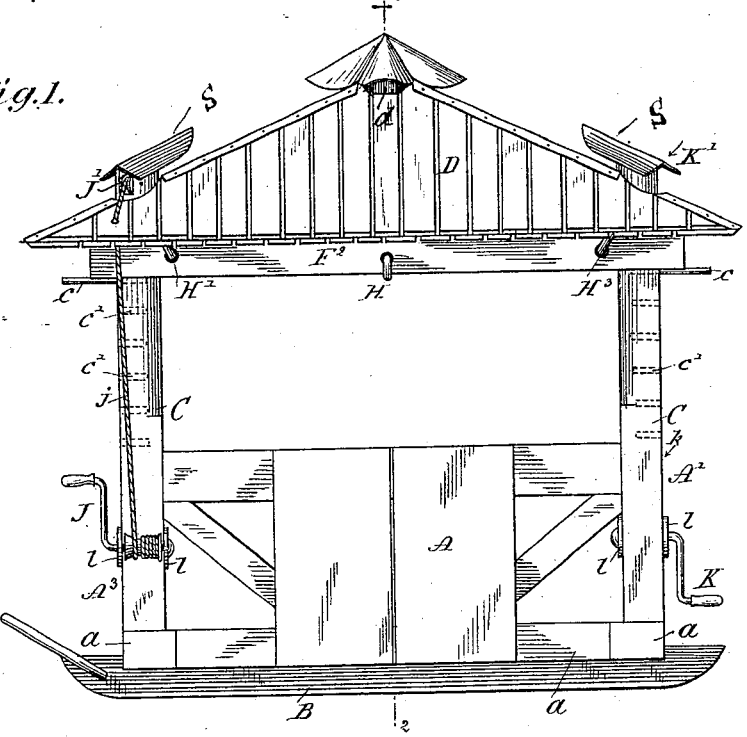
Figure 2:
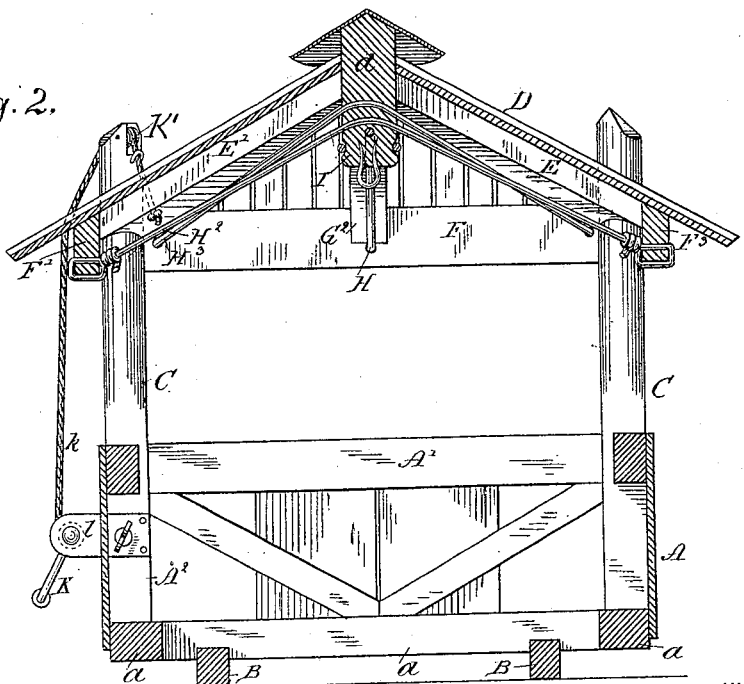
Figure 3:
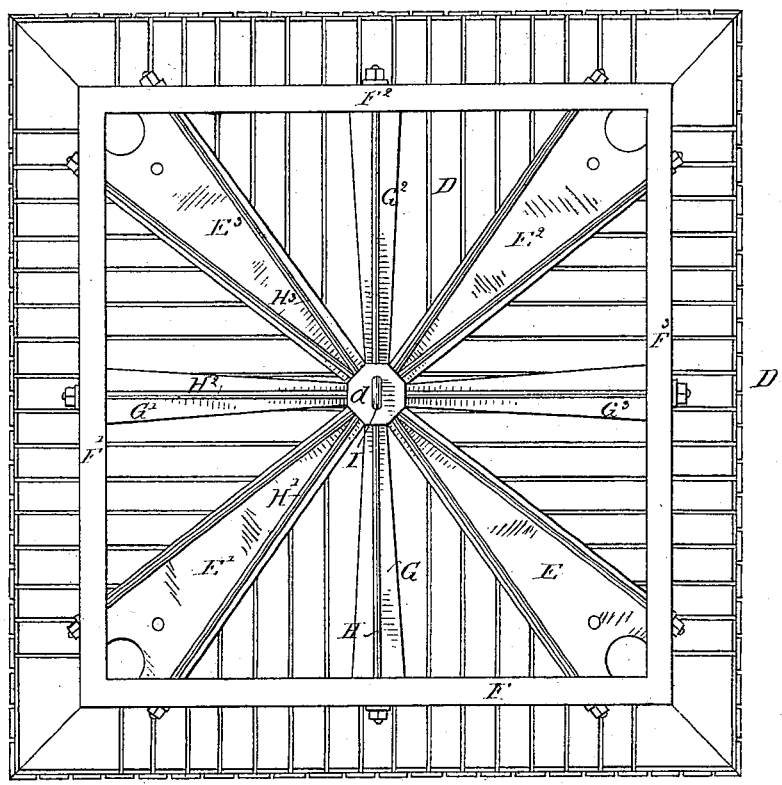

In the accompanying drawings, Figure 1 is a view in side elevation of my improved bin, and Fig. 2 is a vertical central section therethrough on the line 2 2 of Fig. 1. Fig. 3 is an inverted plan view of the adjustable roof of the bin detached.

The side frames, A A' A² A³, of the bin are preferably joined together so as to form a square four-sided inclosure. The bottom pieces or sills, $a$, of the bin are stout timbers, and are mounted preferably upon runners B B, so as to enable the bin to be readily hauled about or moved from place to place by a team when desired. The sides of the bin are preferably fenced or boarded up to a height of several feet—say five or six feet— so as to render the inclosure secure against the intrusion of stock. The bin at one side is preferably provided with a door or doors, (not necessary to be shown,) so as to permit ready access to the bin when unfilled with hay or grain in order to store or shelter agricultural machinery or other things which it is desirable to protect from rain, &c.

Four posts or uprights, C, forming the corner-timbers of the bin, extend up some distance—say twenty feet, more or less—from the ground, according to the height it may be desired to raise the roof, and form rigid vertical guides and supports for the roof D, which is adjustable or rendered capable of being readily raised up and down relatively to said supports.

The roof D is preferably substantially a hip-roof, or is one slanting upon four sides from an apex or center formed by a central timber, $d$, to the eaves. The timbers E E' E² E³, corresponding to the usual hip-rafters, are at the center, where they converge, tenoned into the timber $d$, while at their outer ends, which are widened, they are firmly interlocked and secured to timbers F F' F² F³, arranged around the lower edge of the roof, to which and to the said rafter-timbers E E' E² E³ the boards forming the covering of the roof are nailed. In order to brace the roof still further, I provide it with the brace-timbers G G' G² G³, and with metal brace rods or cords H H' H² H³, which extend from the central timber, $d$, through which they pass or to which they are firmly secured, to the roof-timbers F F' F² F³, through which they pass, suitable nuts being screwed upon the outer ends of said rods tightly up against the outside of said roof-timbers to thoroughly tighten and brace the roof. The outer ends of the metallic brace-rods are shown as bent upon or looped around the roof-timbers at their outer ends; but I will in practice use the screw-nuts as the fastenings, as shown in Fig. 3.

A staple, hook, or connection, I, is secured in or to the lower end of the central roof-timber, $d$, in order to form a point of suspension for a turning or swiveling hay-fork of any of the well-known forms in common use suitable for rapidly unloading hay or grain from wagons in large masses or bulks. Inasmuch as when the roof is elevated the four sides of the bin above the fenced-in portion are open, it will be obvious that the fork may readily be manipulated to unload a wagon from any side of the bin. This is a feature of great utility and advantage. Inasmuch, also, as the weight of the fork and its mass of hay or grain carried by it in unloading is borne by the roof through the timber d, the necessity for the great strength and thorough bracing of the roof I have described is obvious.

The roof D is elevated or depressed according to the bulk of the mass to be placed or contained in the bin. The roof is guided up and down upon the posts or supports C, which pass through openings near the edge of the roof, at the four corners thereof, (the openings being formed in the outer ends of the rafter-timbers E E' E² E³,) and is elevated and lowered preferably by means of two windlasses, J K, from the respective drums of which cords $j\ k$ are run up over pulleys J' K', mounted in or upon the upper ends of diametrically-opposite posts C C, for example, the ends of the cords being then preferably passed through openings in the roof and made fast. The roof is thus suspended by the windlass-cords at two diametrically-opposite corners thereof, and it will be obvious that by letting out or winding up this cord the roof will be either lowered or elevated.

When the roof has been adjusted to the desired altitude it may be locked from descending by pins c, which are adapted for insertion in any of the series of horizontal openings c', formed in the posts C. The roof may thus be securely locked from descending, so as to relieve the hoisting ropes or chains from strain. Instead of this arrangement of locking-pins, however, the windlass-shaft may be locked by the usual pawl and ratchet to maintain the roof in its adjusted position by suspension from the hoisting cords or chains.

The windlass-shafts are preferably journaled in metallic plates $l\ l$, which are secured to the posts C by removable bolts and nuts, so that said windlasses are readily detachable in order that the windlasses may be common to several bins, or, in other words, be capable of being readily removed from one bin and applied to another to adjust its roof.

In order to prevent rain from entering through the openings in the roof through which the uprights C pass, when the roof is raised to shelter hay or other things placed in the bin, I provide the upper ends of said uprights with comparatively large water-shields or fender-plates S, preferably of sheet metal, to turn off the rain which would otherwise gain access to the interior of the bin.

It will be obvious that the windlass-cords may be run so as to be operated by a single windlass-shaft or by more than two windlasses; but I prefer the organization shown.

Having thus described the best way now known to me of embodying all my improvements in one apparatus, what I claim as my invention is—

1. The combination, substantially as hereinbefore set forth, of the bin-frame, the roof provided with openings at its corners for the passage of uprights rising from said frame, the stationary windlasses secured to said frame to raise and lower said roof, and the water-shields or fenders to prevent the access of water into the bin through said roof-openings when said roof is elevated to constitute a shelter.

2. The improved portable hay and grain bin, substantially as hereinbefore set forth, the same consisting of the bin-frame, the runners upon which said frame is mounted, the uprights of said frame, the braced and central-timbered roof adjustable vertically upon said uprights, the windlasses for elevating and lowering said roof, and the connection of said roof from which to suspend a turning or swiveling fork to unload from either side of the bin.

In testimony whereof I have hereunto subscribed my name this 2d day of May, A. D. 1882.

JOSEPH KIMERER.

Witnesses:
THOMAS J. MCLAUGHLIN,
WILLIAM JOHNSTON.